US012746526B2

(12) United States Patent
Yu et al.

(10) Patent No.: US 12,746,526 B2
(45) Date of Patent: Sep. 29, 2026

(54) SILICON-ALUMINUM-IRON COMPOSITE MATERIAL, AND PREPARATION METHOD THEREFOR AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Aixia Li, Foshan (CN); Yinghao Xie, Foshan (CN); Xuemei Zhang, Foshan (CN); Zhixu Lu, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 352 days.

(21) Appl. No.: 18/682,107

(22) PCT Filed: Dec. 1, 2022

(86) PCT No.: PCT/CN2022/135990

§ 371 (c)(1),
(2) Date: Feb. 7, 2024

(87) PCT Pub. No.: WO2023/160105

PCT Pub. Date: Aug. 31, 2023

(65) Prior Publication Data

US 2024/0342681 A1 Oct. 17, 2024

(30) Foreign Application Priority Data

Feb. 22, 2022 (CN) ......................... 202210163890.2

(51) Int. Cl.
*B01J 20/02* (2006.01)
*B01J 20/28* (2006.01)
(Continued)

(52) U.S. Cl.
CPC ..... *B01J 20/0251* (2013.01); *B01J 20/28004* (2013.01); *B01J 20/28059* (2013.01);
(Continued)

(58) Field of Classification Search
CPC .............. B01J 20/0251; B01J 20/28004; B01J 20/28059; B01J 20/28073; B01J 20/3204;
(Continued)

(56) References Cited

U.S. PATENT DOCUMENTS

2015/0306573 A1 10/2015 Calderone et al.

FOREIGN PATENT DOCUMENTS

CN 101368012 A 2/2009
CN 106853373 A * 6/2017 .......... B01J 23/8926

OTHER PUBLICATIONS

Translation of Liu (CN-106853373-A) (Year: 2017).*
(Continued)

*Primary Examiner* — Ekandra S. Miller-Cruz
(74) *Attorney, Agent, or Firm* — Westbridge IP LLC

(57) ABSTRACT

The present disclosure discloses a silicon-aluminum-iron composite material and a preparation method therefor and use thereof, and belongs to the technical field of wastewater treatment. The silicon-aluminum-iron composite material comprises an inner core and an outer shell wrapping the inner core; the inner core is a silicon-aluminum-based hollow sphere; the outer shell contains iron element; and
(Continued)

there are holes on the silicon-aluminum-iron composite material. The silicon-aluminum-iron composite material of the present disclosure improves the specific surface area of the silicon-aluminum-iron composite material through structural adjustment. When it is used to adsorb heavy metal ions, the adsorption sites are correspondingly increased, which finally improves the adsorption capacity for heavy metal ions.

10 Claims, 1 Drawing Sheet

(51) Int. Cl.
*B01J 20/32* (2006.01)
*C02F 1/28* (2023.01)
*C02F 101/20* (2006.01)

(52) U.S. Cl.
CPC ..... *B01J 20/28073* (2013.01); *B01J 20/3204* (2013.01); *B01J 20/3217* (2013.01); *B01J 20/3236* (2013.01); *B01J 20/3291* (2013.01); *C02F 1/288* (2013.01); *C02F 1/281* (2013.01); *C02F 2101/206* (2013.01)

(58) Field of Classification Search
CPC ................ B01J 20/3217; B01J 20/3236; B01J 20/3291; B01J 20/08; B01J 20/3078; B01J 20/10; B01J 20/02; B01J 20/04; B01J 20/06; B01J 20/28021; C02F 1/288; C02F 1/281; C02F 2101/206; C02F 2001/425; C02F 2209/006; C02F 2209/055; C02F 2303/16; C02F 1/42; C02F 2101/20; Y02W 10/37; Y02W 10/00
USPC .......................................................... 210/688
See application file for complete search history.

(56) References Cited

OTHER PUBLICATIONS

Translation of Lei (CN_101368012_A) (Year: 2009).*
International search report of PCT Patent Application No. PCT/CN2022/135990 issued on Feb. 21, 2023.

* cited by examiner

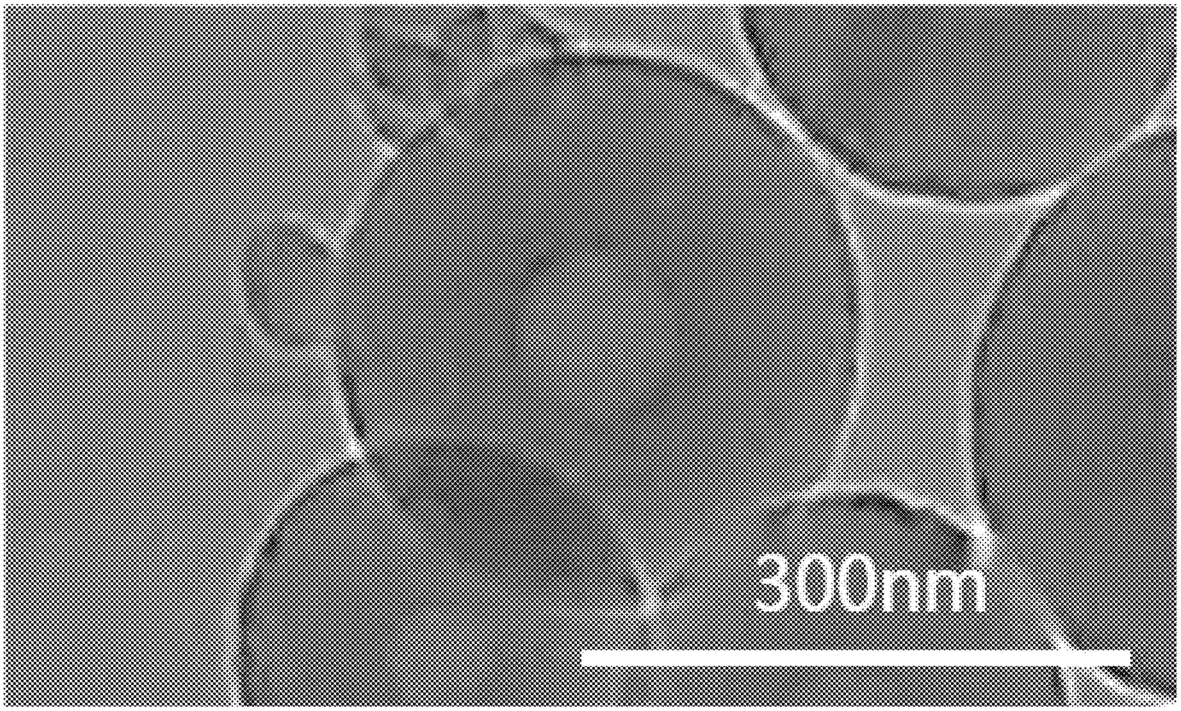
300nm

SILICON-ALUMINUM-IRON COMPOSITE MATERIAL, AND PREPARATION METHOD THEREFOR AND USE THEREOF

FIELD

The present disclosure relates to the technical field of wastewater treatment, and specifically relates to a silicon-aluminum-iron composite material and a preparation method therefor and use thereof.

BACKGROUND

With the increase of production capacity in fields such as mining and metallurgy, about 30-40 billion tons of wastewater, sludge, solvents and other harmful substances contaminated with heavy metals from industrial activities are discharged into water bodies every year. Heavy metal ions pose a risk to humans as well as to flora and fauna that come into contact with the water bodies. Manganese is one of heavy metal ions that contribute to poor intellectual and cognitive development in human. For example, excessive accumulation of manganese in specific brain regions can produce neurotoxicity and lead to brain degenerative diseases. When the concentration of manganese ions in water is greater than 240 μg/L, it can cause impairments on speed, short-term memory and visual recognition in children. The main source of manganese pollution is industrial wastewater, for example, from wastewater treatment plants, mines and quarries. Therefore, wastewater contaminated with heavy metals must be purified, otherwise it will cause serious environmental problems.

Among the related technologies, the main technologies for treating manganese-containing wastewater include methods such as chemical precipitation and ion exchange. Although these water treatment methods can remove manganese to a certain extent, the current methods have shortcomings in terms of processing capacity, equipment footprint, process complexity, application scope, maintenance and operating costs. Additionally, adsorption is an efficient and economical water treatment process that has been used to remove different types of heavy metals due to its high efficiency, simplicity and environmental friendliness. However, the existing adsorbents are unsatisfied in the treatment of manganese-containing wastewater. Therefore, there is an urgent need to develop an adsorbent that can efficiently remove manganese.

SUMMARY

The following is a summary of subject matters described in detail herein. This summary is not intended to limit the scope of protection of claims.

The present disclosure aims to solve at least one of the above-mentioned technical problems existing in the prior art. For this purpose, the present disclosure provides a silicon-aluminum-iron composite material with a hollow core-shell structure, which increases the specific surface area of the silicon-aluminum-iron composite material. When it is used to adsorb heavy metal ions, the adsorption sites are correspondingly increased, which improves the adsorption capacity for heavy metal ions.

The present disclosure also provides a method for preparing the above-mentioned silicon-aluminum-iron composite material.

The present disclosure also provides use of the above-mentioned silicon-aluminum-iron composite material.

According to one aspect of the present disclosure, a silicon-aluminum-iron composite material is provided, comprising an inner core and an outer shell wrapping the inner core, wherein the inner core is a silicon-aluminum-based hollow sphere;

the outer shell contains iron element; and holes are distributed on the inner core and the outer shell.

According to a preferred embodiment, the present disclosure has at least the following beneficial effects:

To a certain extent, the specific surface area of the adsorbent is positively correlated with the adsorption capacity of the adsorbent. The silicon-aluminum-iron composite material provided by the present disclosure has both a hollow structure and a pore structure, so it has a higher specific surface area, and when used as an adsorbent, it exhibits higher adsorption capacity.

In some embodiments of the present disclosure, the particle size of the silicon-aluminum-iron composite material is 0.2-0.3 μm.

In some embodiments of the present disclosure, the pore volume of the silicon-aluminum-iron composite material is 0.55-0.7 $cm^3/g$.

In some embodiments of the present disclosure, the specific surface area of the silicon-aluminum-iron composite material is 40-42.5 $m^2/g$.

In some embodiments of the present disclosure, the removal efficiency of the silicon-aluminum-iron composite material for manganese in wastewater is ≥99.72%.

In some embodiments of the present disclosure, the adsorption capacity of the silicon-aluminum-iron composite material for manganese is ≥107.2 mg/g.

In some embodiments of the present disclosure, the main materials of the silicon-aluminum-based hollow sphere include silicic acid and aluminum hydroxide.

In some embodiments of the present disclosure, the main material of the outer shell is selected from the group consisting of elemental iron, ferric hydroxide, ferrous hydroxide and a combination thereof.

According to another aspect of the present disclosure, a method for preparing the silicon-aluminum-iron composite material is provided, comprising steps of:

S1. mixing a silica-alumina powder and an alkaline solution for reaction to obtain a mixture, wherein the alkaline solution is a mixed solution of NaOH and $Na_2CO_3$; and S2. adding iron salt to the mixture obtained in step S1, and reacting under ultraviolet irradiation.

Step S1 is the process of dissolving the silica-alumina powder to generate sodium silicate and sodium metaaluminate, and the specific reactions that occur include the following:

$$SiO_2+2NaOH=Na_2SiO_3+H_2O; \text{ and}$$

$$Al_2O_3+2NaOH=2NaAlO_2+H_2O.$$

In step S2, the hydrolysis of the iron salt can increase the acidity in the system, and promote the precipitation of sodium silicate and sodium metaaluminate to generate silicic acid and colloidal precipitated aluminum hydroxide, meaning a process of promoting the remodeling of solid matter. Wherein, silicic acid will form amorphous silica (silica gel) in supersaturated solution; and the newly formed solid substance has higher porosity and specific surface area, thus improving the adsorption performance.

Since the acidity provided by the iron salt is relatively mild, the remodeling process of solid matter in step S2 is slower than the process of dissolving the silica-alumina powder by the alkaline solution, so microspheres with a hollow structure can be generated; that is to say, the iron salt has a guiding effect to a hollow structure.

In step S2, ultraviolet irradiation can electrolyze water to generate hydroxyl and hydrogen radicals, wherein hydroxyl, as a strong oxidizing substance, can accelerate the breaking of Si—O—Si or Al—O bonds, that is, promote the dissolution of the silica-alumina powder. In addition, the micro-nano particles such as silica gel generated in step S2 have a photocatalytic effect, and after being irradiated by ultraviolet rays, they will generate photogenerated carriers (electron-hole pairs), which can reduce the iron ions in the iron salt to elemental iron, causing the combination of unreduced iron ions with hydroxide radicals in the system to generate iron hydroxide. The generated elemental iron and ferric hydroxide tend to be enriched on the surface of the silicon-aluminum-iron composite material, to form a core-shell structure; and further, the generated elemental iron can be combined with silica gel to further enhance its photocatalysis effect and increase the generation ratio of elemental iron.

According to a preferred embodiment of the present disclosure, the method has at least the following beneficial effects.

The method provided by the present disclosure has simple process and low cost, which is favorable for large-scale production.

In some embodiments of the present disclosure, in step S1, the mesh number of the silica-alumina powder is 100-200 meshes.

In some embodiments of the present disclosure, in step S1, the silica-alumina powder is a mixture of aluminum oxide and silicon oxide.

In some embodiments of the present disclosure, in step S1, the mass ratio of silicon oxide to aluminum oxide in the silica-alumina powder is 1:1-2.

In some embodiments of the present disclosure, in step S1, the concentration of the alkaline solution is 0.5-2 mol/L.

In some embodiments of the present disclosure, in step S1, the concentration of the alkaline solution is about 1 mol/L.

In some embodiments of the present disclosure, in step S1, the molar ratio of NaOH to $Na_2CO_3$ in the alkaline solution is 2-3:1.

When NaOH and $Na_2CO_3$ are mixed in a molar ratio of 2-3:1, a mixed solution with a low eutectic point can be obtained, which is conducive to promoting the diffusion of NaOH and $Na_2CO_3$ into the silica-alumina powder, thereby promoting the dissolution of the silica-alumina powder.

In some embodiments of the present disclosure, in step S1, the mass-volume ratio of the silica-alumina powder to the alkaline solution is 1 g:20-30 mL.

In some embodiments of the present disclosure, in step S1, the reaction lasts for 1-2 h.

In some embodiments of the present disclosure, in step S1, the reaction is performed under stirring, and a rotation speed of the stirring is 100-200 rpm.

In some embodiments of the present disclosure, the molar ratio of the silica-alumina powder to the iron salt is 15-30:1.

In some embodiments of the present disclosure, in step S2, the iron salt is selected from the group consisting of a trivalent iron salt, a divalent iron salt and a combination thereof.

In some embodiments of the present disclosure, the trivalent iron salt is selected from the group consisting of ferric nitrate ($Fe(NO_3)_3$), ferric chloride ($FeCl_3$), ferric sulfate ($Fe_2(SO_4)_3$) and a combination thereof.

In some embodiments of the present disclosure, the divalent iron salt is selected from the group consisting of ferrous chloride ($FeCl_2$), ferrous sulfate ($FeSO_4$) and a combination thereof.

In some embodiments of the present disclosure, in step S2, the wavelength of the ultraviolet rays is <400 nm.

In some embodiments of the present disclosure, in step S2, the source of the ultraviolet rays is selected from the group consisting of a mercury lamp, a xenon lamp, a xenon mercury lamp and a combination thereof.

In some embodiments of the present disclosure, the power of the source of the ultraviolet rays is 300-1200 W.

In some embodiments of the present disclosure, in step S2, the temperature of the reaction is 60-90° C.

In some embodiments of the present disclosure, in step S2, the reaction lasts for 6-12 h.

In some embodiments of the present disclosure, step S2 further comprises washing the obtained solid after the reaction with water until nearly neutral, and then drying.

In some embodiments of the present disclosure, the nearly neutral pH ranges from 6.5 to 7.5.

In some embodiments of the present disclosure, the drying is performed at a temperature of 60-90° C.

In some embodiments of the present disclosure, the drying lasts for 12-24 h.

According to yet another aspect of the present disclosure, an adsorbent is provided, wherein a raw material for preparing the adsorbent comprises the silicon-aluminum-iron composite material or the silicon-aluminum-iron composite material that is prepared by the method.

A preferred adsorbent according to the present disclosure has at least the following beneficial effects:

Under the conditions of room temperature and atmospheric pressure, the maximum adsorption capacity of the adsorbent for manganese reached 115.4 mg/g, superior to the common manganese removal adsorbents in the market.

In some embodiments of the present disclosure, the adsorbent may be the silicon-aluminum-iron composite material or a combination thereof with an auxiliary material.

In some embodiments of the present disclosure, the auxiliary material is selected from the group consisting of a conductive agent, a binder and a combination thereof.

According to yet another aspect of the present disclosure, use of the adsorbent in the treatment of heavy metal wastewater is provided.

In some embodiments of the present disclosure, the use includes adsorption treatment of the heavy metal wastewater with the adsorbent.

In some embodiments of the present disclosure, the heavy metal wastewater contains 50-100 mg/L of manganese ions.

In some embodiments of the present disclosure, the adsorption treatment is performed at a temperature of 20-30° C.

In some embodiments of the present disclosure, the adsorption treatment is performed at a pH of 3-9.

In some embodiments of the present disclosure, a pH adjusting agent used in the adsorption treatment is selected from the group consisting of NaOH aqueous solution, HCl aqueous solution and a combination thereof; and the concentration of the pH adjusting agent is 0.5 mol/L.

In some embodiments of the present disclosure, the adsorption treatment lasts for 4-6 h.

In some embodiments of the present disclosure, the mass-volume ratio of the adsorbent to the heavy metal wastewater in the adsorption treatment is 1 g:20-40 mL.

In some embodiments of the present disclosure, the use further includes performing solid-liquid separation after the adsorption to obtain purified water and waste adsorbent.

In some embodiments of the present disclosure, the waste adsorbent may be regenerated.

In some embodiments of the present disclosure, the regeneration is to regenerate the waste adsorbent in a regenerating agent.

In some embodiments of the present disclosure, the regenerating agent is selected from the group consisting of NaCl aqueous solution, NaOH aqueous solution, sodium acetate aqueous solution and a combination thereof.

In some embodiments of the present disclosure, the regeneration lasts for 4-6 h.

In some embodiments of the present disclosure, the ratio of the waste adsorbent to the regenerating agent is 1 g:5-10 mL.

BRIEF DESCRIPTION OF DRA WINGS

The present disclosure will be further illustrated below in conjunction with the accompanying drawings and examples, in which:

The sole firgure is a transmission electron microscope image of the silicon-aluminum-iron composite material obtained in Example 1 of the present disclosure.

DETAILED DESCRIPTION

The concept of the present disclosure and the technical effects produced thereby will be clearly and completely described below in conjunction with the examples, so as to fully understand the purpose, characteristics and effects of the present disclosure. Obviously, the described examples are only a part of the examples of the present disclosure, rather than all the examples. Based on the examples of the present disclosure, other examples obtained by those skilled in the art without creative efforts are all within the scope of protection of the present disclosure.

Example 1

In this example, a silicon-aluminum-iron composite material was prepared, and the specific process comprised:

S1. 1 g of silica-alumina powder was added to an alkaline solution and reacted at a rotating speed of 100 rpm for 1 h to obtain a mixture, wherein the silica-alumina powder was a mixture of silicon dioxide and aluminum oxide in a mass ratio of 1:1.2; and the alkaline solution was a mixture of 15 mL of NaOH solution with a concentration of 1 mol/L and 5 mL of $Na_2CO_3$ solution with a concentration of 1 mol/L; and S2. 1 g of $Fe(NO_3)_3$ was added to 100 mL of the mixture obtained in step S1, placed in a water bath and heated to 60° C., and then irradiated with ultraviolet rays for 6 h; after solid-liquid separation, the obtained solid was washed until pH=7 and dried at 60° C. for 12 h to obtain a silicon-aluminum-iron composite material, wherein the wavelength of ultraviolet rays was <400 nm, from a mercury lamp with a power of 1200 w.

The morphology of the silicon-aluminum-iron composite material obtained in this example was shown in the sole figure.

Example 2

In this example, a silicon-aluminum-iron composite material was prepared, and the specific process comprised:

S1. 1 g of silica-alumina powder (same as Example 1) was added to an alkaline solution and reacted at a rotating speed of 120 rpm for 1.5 h to obtain a mixture, wherein the alkaline solution was a mixture of 15 mL of NaOH solution with a concentration of 1 mol/L and 7 mL of $Na_2CO_3$ solution with a concentration of 1 mol/L; and S2. 1 g of $Fe(NO_3)_3$ was added to 100 mL of the mixture obtained in step S1, placed in a water bath and heated to 70° C., and then irradiated with ultraviolet rays for 7 h; after solid-liquid separation, the obtained solid was washed to a neutral pH value and dried at 70° C. for 15 h to obtain a silicon-aluminum-iron composite material, wherein the wavelength of ultraviolet rays was <400 nm, from a mercury lamp with a power of 800 w.

Example 3

In this example, a silicon-aluminum-iron composite material was prepared, and the specific process comprised:

S1. 1 g of silica-alumina powder (same as Example 1) was added to an alkaline solution and reacted at a rotating speed of 160 rpm for 1.5 h to obtain a mixture, wherein the alkaline solution was a mixture of 18 mL of NaOH solution with a concentration of 1 mol/L and 8 mL of $Na_2CO_3$ solution with a concentration of 1 mol/L; and S2. 1 g of $Fe(NO_3)_3$ was added to 100 mL of the mixture obtained in step S1, placed in a water bath and heated to 60° C., and then irradiated with ultraviolet rays for 10 h; after solid-liquid separation, the obtained solid was washed to a neutral pH value and dried at 60° C. for 18 h to obtain a silicon-aluminum-iron composite material, wherein the wavelength of ultraviolet rays was <400 nm, from a mercury lamp with a power of 600 w.

Example 4

In this example, a silicon-aluminum-iron composite material was prepared, and the specific process comprised:

S1. 1 g of silica-alumina powder (same as Example 1) was added to an alkaline solution and reacted at a rotating speed of 200 rpm for 2 h to obtain a mixture, wherein the alkaline solution was a mixture of 22 mL of NaOH solution with a concentration of 1 mol/L and 8 mL of $Na_2CO_3$ solution with a concentration of 1 mol/L; and S2. 1 g of $Fe(NO_3)_3$ was added to 100 mL of the mixture obtained in step S1, placed in a water bath and heated to 90° C., and then irradiated with ultraviolet rays for 12 h; after solid-liquid separation, the obtained solid was washed to a neutral pH value and dried at 90° C. for 24 h to obtain a silicon-aluminum-iron composite material, wherein the wavelength of ultraviolet rays was <400 nm, from a mercury lamp with a power of 300 w.

Example 5

In this example, the silicon-aluminum-iron composite material obtained in Example 1 was used as an adsorbent to carry out the treatment of manganese-containing heavy metal wastewater, and the specific steps were:

100 mL of wastewater with a manganese ion concentration of 50 mg/L was added with 2.5 g of the silicon-aluminum-iron composite material obtained in Example 1. Under the conditions of room temperature and atmospheric pressure (25° C., 1 atmosphere), pH 3 and a speed of 120 rpm, the adsorption was performed under stirring for 4 h. After filtration, a purified aqueous solution and a waste adsorbent were obtained.

Example 6

In this example, the silicon-aluminum-iron composite material obtained in Example 2 was used as an adsorbent to carry out the treatment of manganese-containing heavy metal wastewater, and the specific steps were:

100 mL of wastewater with a manganese ion concentration of 60 mg/L was added with 3 g of the silicon-aluminum-iron composite material obtained in Example 2. Under the conditions of room temperature and atmospheric pressure (25° C., 1 atmosphere), pH 5 and a speed of 140 rpm, the adsorption was performed under stirring for 4.5 h. After filtration, a purified aqueous solution and a waste adsorbent were obtained.

Example 7

In this example, the silicon-aluminum-iron composite material obtained in Example 3 was used as an adsorbent to carry out the treatment of manganese-containing heavy metal wastewater, and the specific steps were:

100 mL of wastewater with a manganese ion concentration of 80 mg/L was added with 3.5 g of the silicon-aluminum-iron composite material obtained in Example 3. Under the conditions of room temperature and atmospheric pressure (25° C., 1 atmosphere), pH 6 and a speed of 160 rpm, the adsorption was performed under stirring for 5 h. After filtration, a purified aqueous solution and a waste adsorbent were obtained.

Example 8

In this example, the silicon-aluminum-iron composite material obtained in Example 4 was used as an adsorbent to carry out the treatment of manganese-containing heavy metal wastewater, and the specific steps were:

100 mL of wastewater with a manganese ion concentration of 100 mg/L was added with 4.0 g of the silicon-aluminum-iron composite material obtained in Example 4. Under the conditions of room temperature and atmospheric pressure (25° C., 1 atmosphere), pH 6 and a speed of 180 rpm, the adsorption was performed under stirring for 6 h. After filtration, a purified aqueous solution and a waste adsorbent were obtained.

Example 9

In this example, the waste adsorbent obtained in Example 5 was used to carry out the treatment of manganese-containing heavy metal wastewater, and the specific steps were:

100 mL of wastewater with a manganese ion concentration of 100 mg/L was added with 4.5 g of the waste adsorbent obtained in Example 8. Under the conditions of room temperature and atmospheric pressure (25° C., 1 atmosphere), pH 5 and a speed of 140 rpm, the adsorption was performed under stirring for 4.5 h. After filtration, a purified aqueous solution and a waste adsorbent were obtained.

Comparative Example 1

In this comparative example, an adsorbent was prepared, and the difference between Comparative Example 1 and Example 4 was:

In step S2, ultraviolet irradiation was directly performed without adding $Fe(NO_3)_3$.

Comparative Example 2

In this comparative example, the adsorbent obtained in Comparative Example 1 was used to carry out the treatment of manganese-containing heavy metal wastewater, and the specific difference between Comparative Example 2 and Example 8 was:

Instead of using the silicon-aluminum-iron composite material obtained in Example 4, the material obtained in Comparative Example 1 was used to prepare the adsorbent.

Test Example

In this test example, the silicon-aluminum-iron composite materials obtained in Examples 1 to 4 and the adsorbent prepared in Comparative Example 1 were tested for the physical and chemical performances.

The specific surface area and pore volume were tested by BET.

The particle size was tested by a Malvern particle size analyzer.

The adsorption capacity was tested and calculated by $(c_o-c_e)$ v/m; where $c_0$ represented the initial mass concentration of heavy metals in wastewater containing heavy metals; $c_e$ represented the concentration of heavy metals in wastewater containing heavy metals after adsorption equilibrium; v represented the volume (L) of wastewater containing heavy metals; and m represented the mass (g) of the adsorbent; and the test method for $c_0$ and $c_e$ was ICP-OES.

The test results were shown in Table 1.

TABLE 1

Physical and chemical performances of materials obtained in Examples 1-4 and Comparative Example 1

| Sample | Specific surface area ($m^2/g$) | Particle size (μm) | Pore volume ($cm^3/g$) | Adsorption capacity (mg/g) |
|---|---|---|---|---|
| Example 1 | 40.3 | 0.24 | 0.67 | 107.2 |
| Example 2 | 41.7 | 0.29 | 0.62 | 112.3 |
| Example 3 | 42.1 | 0.26 | 0.58 | 115.4 |
| Example 4 | 41.2 | 0.27 | 0.63 | 110.6 |
| Comparative Example 1 | 35.1 | 0.43 | 0.42 | 82.5 |

Table 1 showed that the silicon-aluminum-iron composite material provided by the present disclosure had smaller particle size, larger pore volume and specific surface area, and thus had a higher adsorption capacity than the adsorbent obtained in Comparative Example 1. It was indicated that the addition of iron salt can indeed lead to the formation of silicon-aluminum-iron composite material with a hollow core-shell structure, and this structure can indeed improve the adsorption capacity for manganese.

In this test example, the adsorption performance of each adsorbent in Examples 5-9 and Comparative Example 2 was also tested. The efficiency of manganese removal was calculated by: (manganese concentration in initial heavy metal wastewater-manganese concentration in aqueous solution after purification)/manganese concentration in initial heavy metal wastewater; and the test method of manganese concentration was ICP-OES. The test results showed that the efficiencies of manganese removal in Examples 5-8 and Comparative Example 2 were 99.72%, 99.91%, 99.99%, 99.95% and 87.5%, respectively. These results demonstrated that the adsorption performance of the silicon-aluminum-iron composite materials obtained in Examples 1-4 of the present disclosure for manganese was obviously better than that of the iron-free adsorbent obtained in Comparative Example 1. In Example 9, the waste adsorbent was used to remove manganese, with an efficiency of manganese removal being 95% and adsorption capacity being 95 mg/g, indicating that the waste adsorbent still had good ability for manganese removal.

The examples of the present disclosure have been described in detail above in conjunction with the drawings. However, the present disclosure is not limited to the above-mentioned examples, and various modifications can be made without departing from the purpose of the present disclosure within the scope of knowledge possessed by those of ordinary skill in the art. In addition, in the case of no conflict, the examples and the features in the examples of the present disclosure may be combined with each other.

The invention claimed is:

1. A method for producing a silicon-aluminum-iron composite material, comprising steps of:

S1. mixing a silicon-alumina powder and an alkaline solution for reaction to obtain a mixture; the alkaline solution is a mixed solution of NaOH and $Na_2CO_3$; and S2. adding iron salt to the mixture obtained in step S1, and reacting under ultraviolet irradiation;

wherein the silicon-aluminum-iron composite material comprises an inner core and an outer shell wrapping the inner core; the inner core is a silicon-aluminum-based hollow sphere; the outer shell contains iron element; and holes are distributed on the inner core and outer shell.

2. The method according to claim 1, wherein in step S1, the concentration of the alkaline solution is 0.5-2 mol/L.

3. The method according to claim 1, wherein in step S1, the mass-volume ratio of the silicon-alumina powder to the alkaline solution is 1 g: 20-30 mL.

4. The method according to claim 1, wherein the silicon-alumina powder is a mixture of alumina and silicon oxide.

5. The method according to claim 1, wherein the particle size of the silicon-aluminum-iron composite material is 0.2-0.3 μm.

6. The method according to claim 1, wherein the pore volume of the silicon-aluminum-iron composite material is 0.55-0.7 $cm^3/g$.

7. The method according to claim 1, wherein the specific surface area of the silicon-aluminum-iron composite material is 40-42.5 $m^2/g$.

8. An adsorbent, wherein a preparation material of the adsorbent comprises the silicon-aluminum-iron composite material prepared by the method according to claim 1.

9. The method according to claim 2, wherein in the alkaline solution, the molar ratio of NaOH to $Na_2CO_3$ is 2-3:1.

10. The method according to claim 4, wherein the molar ratio of the silicon-alumina powder to the iron salt is 15-30:1.

* * * * *